(12) United States Patent
Golliher

(10) Patent No.: US 8,682,919 B1
(45) Date of Patent: Mar. 25, 2014

(54) SYSTEM AND METHOD FOR NAVIGATING RELATED DATA

(75) Inventor: Geoffrey Golliher, Azusa, CA (US)

(73) Assignee: Google Inc., Mountain View, CA (US)

( * ) Notice: Subject to any disclaimer, the term of this patent is extended or adjusted under 35 U.S.C. 154(b) by 989 days.

(21) Appl. No.: 11/022,545

(22) Filed: Dec. 23, 2004

(51) Int. Cl.
*G06F 17/30* (2006.01)

(52) U.S. Cl.
USPC .......................................................... 707/769

(58) Field of Classification Search
USPC ............................................................ 707/3
See application file for complete search history.

(56) References Cited

U.S. PATENT DOCUMENTS

| | | | |
|---|---|---|---|
| 6,401,102 B1 * | 6/2002 | Ishii et al. | 707/104.1 |
| 2003/0023754 A1 * | 1/2003 | Eichstadt et al. | 709/246 |
| 2004/0145660 A1 * | 7/2004 | Kusaka | 348/211.2 |
| 2004/0268393 A1 * | 12/2004 | Hunleth et al. | 725/44 |
| 2005/0270311 A1 * | 12/2005 | Rasmussen et al. | 345/677 |

* cited by examiner

*Primary Examiner* — Khanh Pham
*Assistant Examiner* — Johnese Johnson
(74) *Attorney, Agent, or Firm* — Morris & Kamlay LLP

(57) ABSTRACT

A coordinate system is assigned to an object in a group of objects (e.g. an image in a digital photo album or a page in a document). The object is rendered on a display. A value correlated to the coordinate system is transmitted when another object in the group of objects is to be viewed. From this value, another related object (e.g. the next image in the album or the next page in the document) is identified and transmitted. This related object is then rendered on the display in place of the first object.

48 Claims, 15 Drawing Sheets

702A

702B

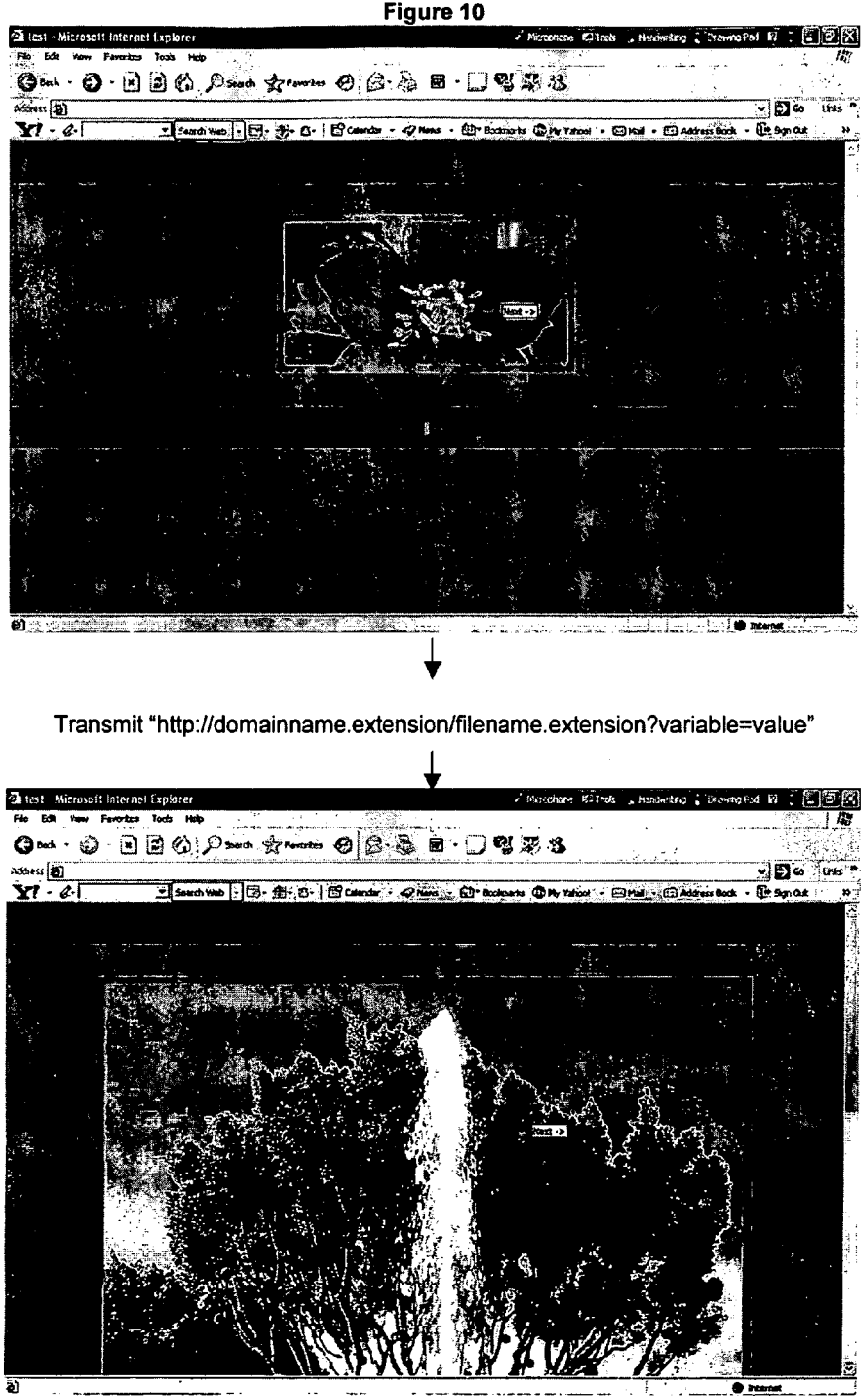

SYSTEM AND METHOD FOR NAVIGATING RELATED DATA

TECHNICAL FIELD

The present invention relates generally to the field of data navigation in computing and telecommunication systems, and in particular, to a system and method for navigating within a group of related data.

BACKGROUND

As electronic data becomes more available, many data navigation systems focus on giving users ways to navigate within potentially unrelated data. In some of these generic systems, users take several steps to drill down alphabetized folders. In others, users move cursors to non-intuitive locations to navigate to the next data or set of data.

Like many generalized systems, these generic navigation systems are often not as efficient as a specialized system when applied to specific situations. For example, these generic navigation systems may result in slow navigation of related data. A specialized system may provide more intuitive and more efficient methods for navigating the related data. Thus, what is desirable is an improved system and method for navigating related data.

SUMMARY OF THE INVENTION

In accordance with one aspect of one embodiment of the invention, a method may transmit a first object in a group of related objects. The first object is to be assigned a coordinate system. The method may include receiving a value to correlate to the coordinate system and determining from the value a second object in the group of related objects. The method may also include transmitting the second object.

In accordance with one aspect of another embodiment of the invention, a method may transmit to a client a first image in a group of related images. The first image is to be assigned a coordinate system. The method may include receiving from the client a value to correlate to the coordinate system. The method may also include querying a data collection to determine a second image in the group of related images. The querying is to include a parameter to be associated with the value. The method may further include transmitting to the client the second image.

In accordance with one aspect of another embodiment of the invention a method may display a first object in a group of related objects. The first object is to be assigned a coordinate system. The method may also include transmitting a value to correlate to the coordinate system and receiving a second object in the group of related objects in response to the transmitting. The method may further include displaying the second object in place of the first object.

In accordance with one aspect of another embodiment of the invention a method may display a first image in a group of related images. The first image is to be assigned a coordinate system. The method may also include displaying a visual cue when a cursor is in a region of the first image and recording, in response to an event, a coordinate to indicate a location of the cursor in the coordinate system. The method may further include determining a value from the coordinate and transmitting the value. The method may additionally include receiving a second image in response to the transmitting and displaying the second image in place of the first image.

In accordance with one aspect of another embodiment of the invention, an apparatus may include a means for transmitting a first object in a group of related objects. The first object is to be assigned a coordinate system. The apparatus may further include a means for receiving a value to correlate to the coordinate system. The apparatus may also include a means for searching a data collection to determine a second object in the group of related objects. The searching is to include a parameter to be associated with the value. The apparatus may additionally include a means for transmitting the second object.

In accordance with one aspect of another embodiment of the invention, a system may include a set of related visual objects to be stored in a data collection. The set is to include a first visual object to be assigned a coordinate system and second visual object. The system may also include a receiving module to receive a value to correlate to a position in the coordinate system. The system may further include a determination module to determine the second visual object from the value and a transmission module to transmit the second visual object.

BRIEF DESCRIPTION OF DRAWINGS

FIG. 10 depicts consecutive screen shots in accordance with one embodiment of the invention.

DETAILED DESCRIPTION

Figure 1:
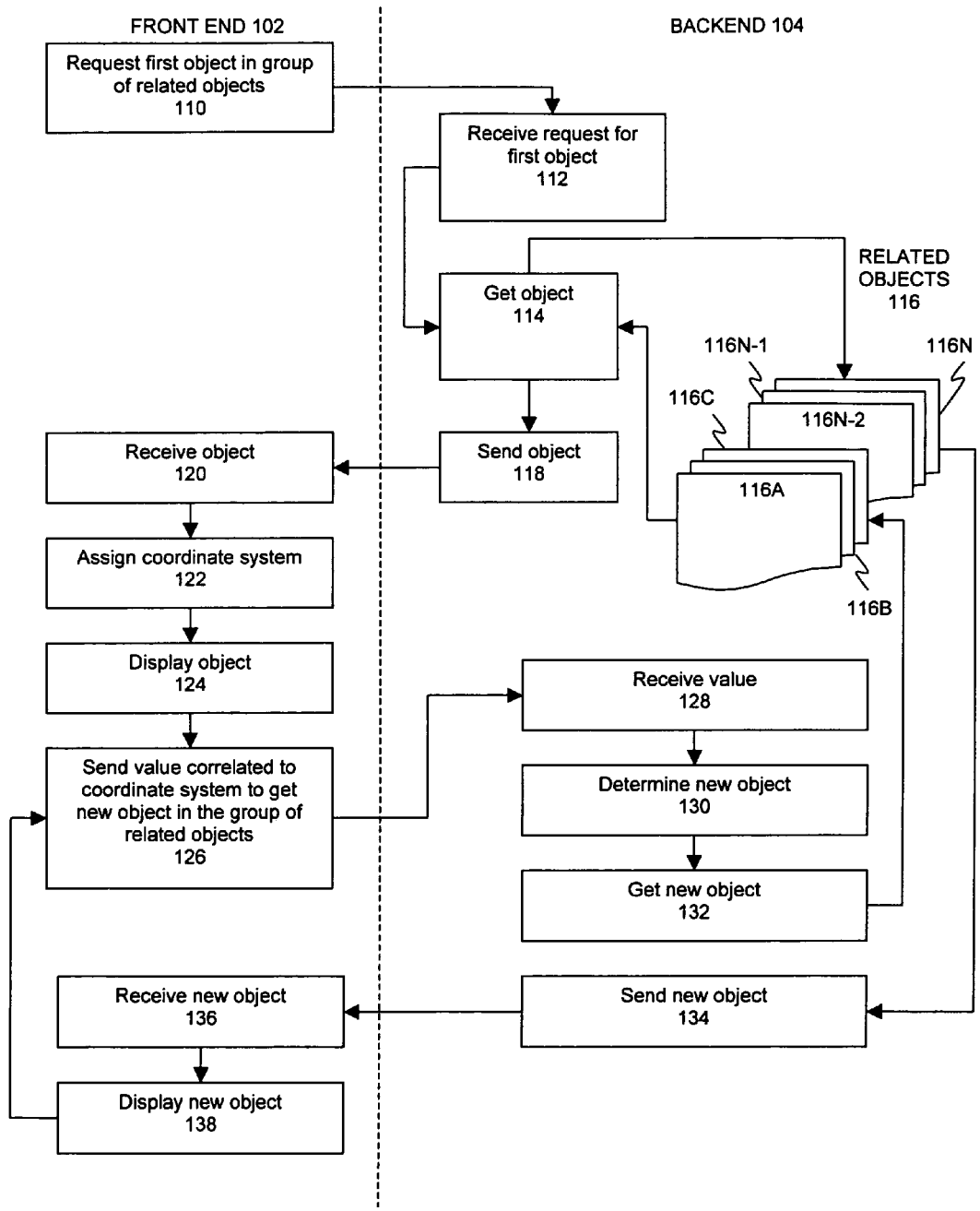
FIG. 1 depicts a data flow diagram of a system for navigating a group of related data in accordance with one embodiment of the invention.

A system and method for navigated related data is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail so as not to obscure the present invention unnecessarily.

Overview

This invention allows a user to navigate a group of related objects. For example, in one embodiment, a user navigates a series of related images in a digital photo album. Using this invention, the user may open an application and view the first image in the album. When the user wants to navigate to another image in the album, the user may roll a cursor over a part of the image. In one embodiment, when the user rolls the cursor over the right half of the image, a visual cue, e.g. a thumbnail showing the next image, appears near the cursor. If the user clicks on a mouse button while over the right half of the image, then the next image in the album appears. If the user clicks on a mouse button while over the left half of the image, then the previous image in the album appears. Therefore, by clicking on certain parts of the displayed image, the user navigates to other images within the album.

In another embodiment, a user navigates different parts of a large picture. For example, a high resolution picture may not be entirely visible on a computer screen. The top left corner of the picture may be visible but not the bottom right corner, for example. Using the invention, the user may click on the bottom right corner of the visible portion of the picture. The bottom right corner is then displayed. If the user clicks on the top right corner of the visible portion of the picture, then the top right corner is displayed. Therefore, by clicking on certain visible parts of the picture, the user navigates to other parts of the picture.

This invention is not limited to navigating a series of images or different parts of large picture. For example, a user may navigate pages in a document. This invention is also not limited to visual cues which are thumbnails. For example, a visual cue may be textual. Additionally, this invention is not limited to navigating the related data using a personal computer. For example, the user may be navigating the data using a personal digital assistant (PDA) or a mobile phone. These as well as other variations within the scope of the invention are explained in further detail below.

System Architecture and Process

Generally, in a system for navigating a group of related data in accordance with the invention, an object is transmitted and displayed to a user. The object is assigned a coordinate system. When a cursor is placed over the rendered object, the cursor will be inside the assigned coordinate system. Therefore, while over the object, the cursor is associated with a coordinate in the assigned coordinate system. To navigate to another image, a value related to the cursor's coordinate in the assigned coordinate system is transmitted to a module which determines the identity of the new object. The new object is then transmitted and displayed to the user.

FIG. 1 depicts a data flow diagram of a system for navigating a group of related data in accordance with one embodiment of the invention. FIG. 1 is divided into a front end 102 and a backend 104. In one embodiment, the navigation system is a client-server system, the front end is a client, and the backend is a server. In another embodiment, the navigation system is a stand-alone computer, the front end is software which handles interactions with a user, and the backend is software and/or hardware which process input from the front end.

Generally, in the embodiment of FIG. 1, the front end first sends a request for a first object in a group of related objects, as seen in block 110. In one embodiment, the request is sent over a network, such as in the embodiment of FIG. 4, which will be discussed in further detail below. In another embodiment, the request is sent over a computer bus, such as in the embodiment of FIG. 5, which also will be discussed in further detail below.

The backend 104 receives the request for the first object, as seen in block 112. The backend then obtains the first object, as indicated in block 114. For example, the first object may be object 116A in a group of related objects 116. In another embodiment, the first object may be any object in the group of related objects, e.g. 116B or 116N.

Figure 2:
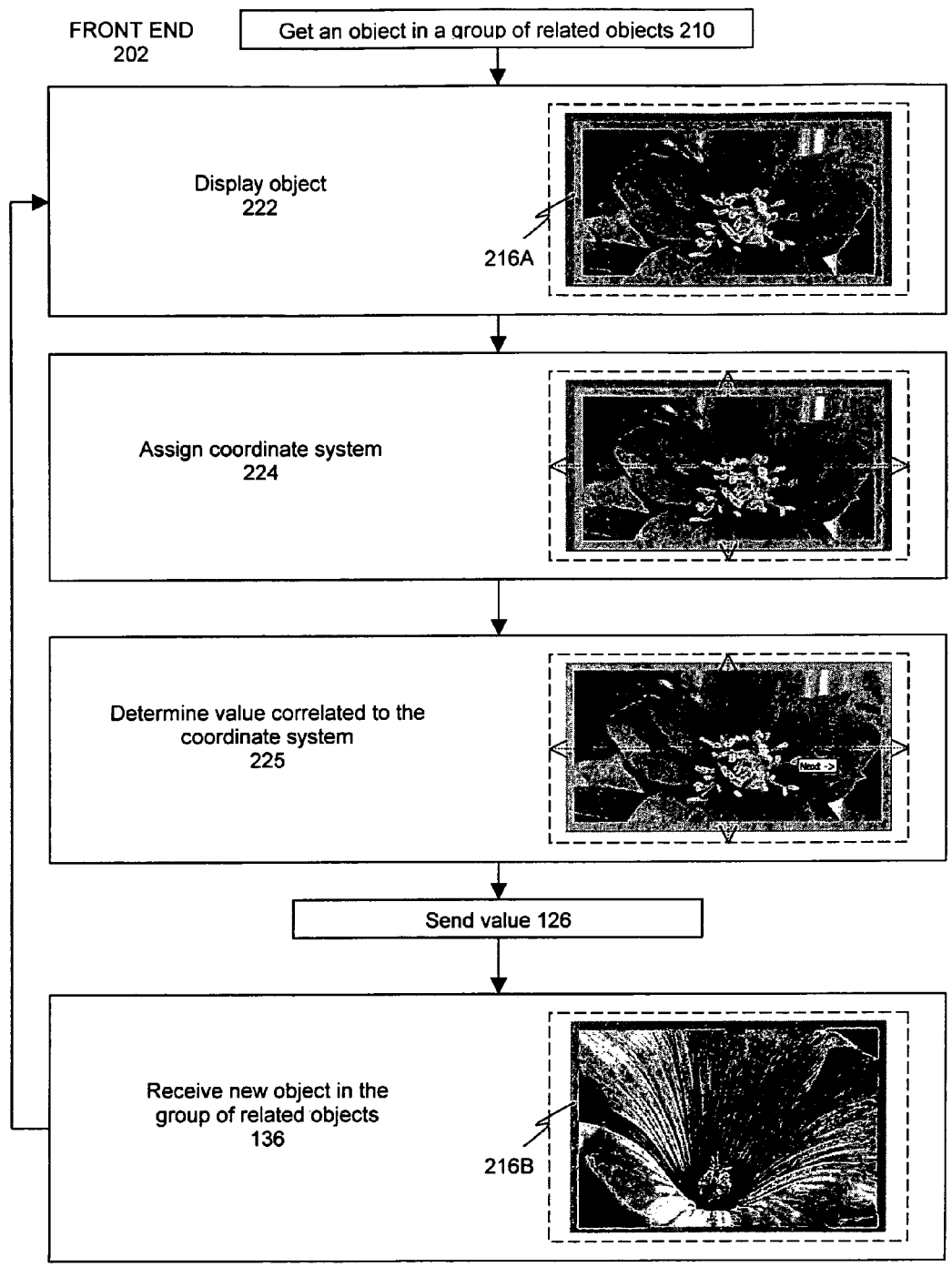
FIG. 2 depicts a flow diagram of a front end in a system for navigating a group of related data in accordance with one embodiment of the invention.

Generally, object 116A is a subset of group 116. In one embodiment, object 116A is a visual object, such as object 216A in the embodiment shown in FIG. 2. In the embodiment of FIG. 2, object 216A is a raster graphic of a visual image, e.g. a digital photograph. In another embodiment, the visual object may be a segment of a visual image, such that object 116A, along with other objects in group 116, form a complete visual image. For example, object 116A may be the top left corner of an image of a beach, containing part of a sky, while the other objects in group 116 may form the remaining image of the beach, including the ocean and the sand. In another embodiment, the visual object may be a vector graphic.

In one embodiment, object 116A is a software object-oriented code object (e.g. a paint object). In another embodiment, object 116A is an electronic file. In certain embodiments, object 116A is an electronic file in an image file format, such as joint photographic experts group (JPEG), graphics interchange format (GIF), tagged image file format (TIFF), portable network graphics (PNG), encapsulated postscript (EPS), portable document format (PDF), JPEG file interchange format (JFIF), JPEG networks graphics (JNG), Windows bitmap (BMP) or device independent bitmap (DIP).

In another embodiment, object 116A is a page in a group of pages, e.g. the first page in a rich text format (RTF) document. In another embodiment, object 116A is a page within a set of related computer-aided design (CAD) format files. In other embodiments, object 116A may be a sheet in a spreadsheet file, a workbook in a set of spreadsheet workbooks or a slide in a slideshow. In another embodiment, object 116A is a subset of a set containing a combination of the above examples.

Group 116 contains N objects. Specifically, group 116 contains objects 116A, 116B, 116C . . . 116N-2, 116N-1 and 116N. Objects within group 116 may be related in a variety of ways, such as by logic or emotion. For example, in one embodiment, group 116 may be a group of image files associated with summer vacations. In another embodiment, group 116 may be a group of image files depicting flowers.

Group 116 may be associated with a sequential order in which a user desires to view the files. The order may not be necessarily related to time of file creation or file name. For example, the order may be related to a sequence in which the images will be discussed in a lecture.

In other embodiments, the group may not be associated with a sequential order, but rather a layout order. For example, a digital photograph may have a resolution greater than one easily viewed on a computer monitor. Group 116 may be associated with a layout order so that object 116A corresponds to the top-left portion of a high-resolution photograph, object 116B corresponds to the top-right portion of the photograph, object 116C corresponds to the lower-left portion, and so on.

Figure 8A:
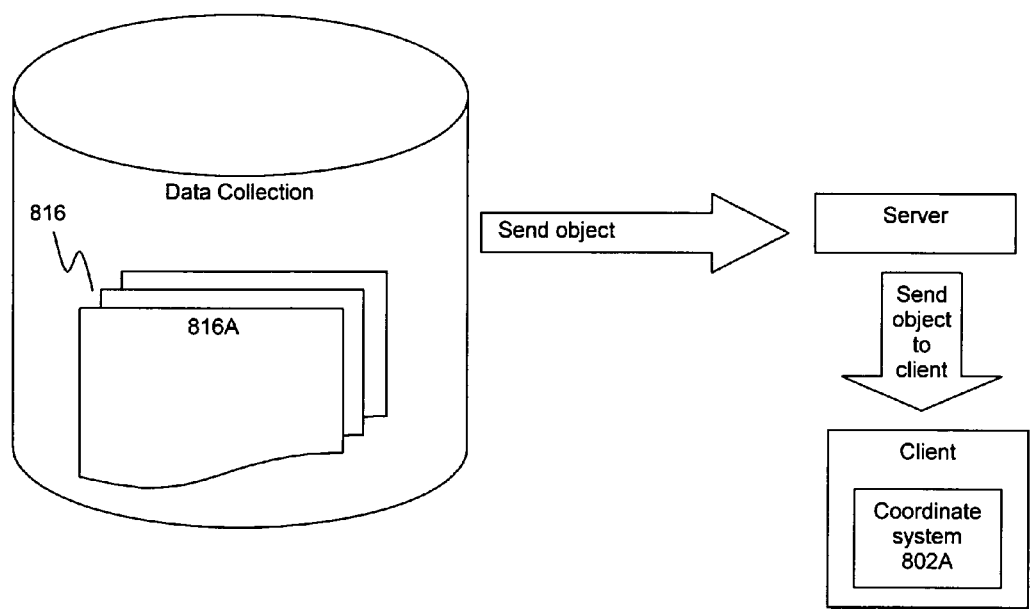
FIGS. 8A-8C illustrates several points in which a coordinate system may be assigned to an object in accordance with various embodiments of the invention.
Figure 8B:
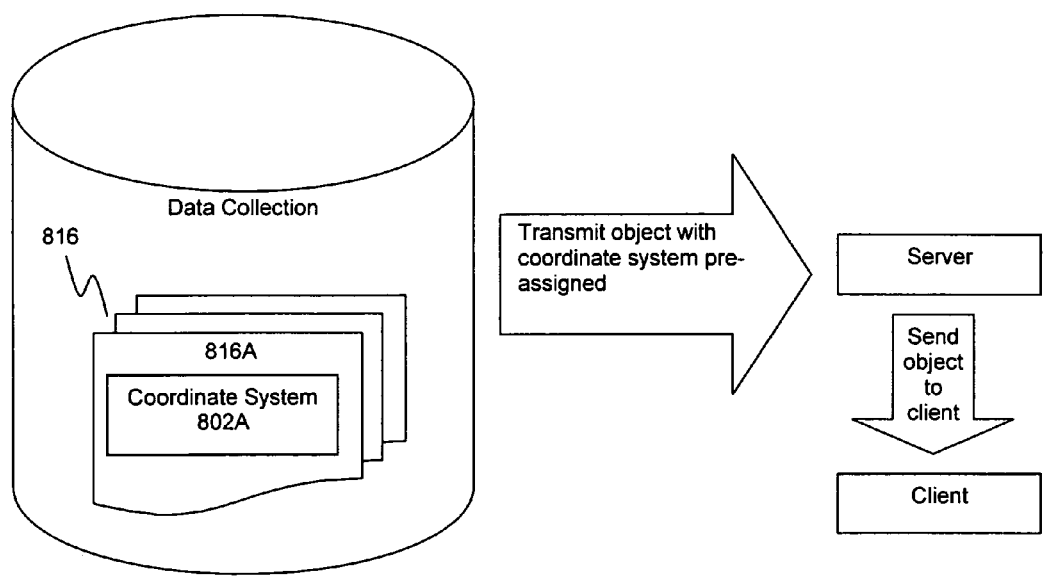

In FIG. 1, after the first object is retrieved in block 114, backend 104 sends the first object to the front end in block 118. The front end receives the first object in block 120. In the embodiment shown in FIG. 1, the front end assigns the first object a coordinate system in block 122. In other embodiments, the backend assigns the object a coordinate system, as shown in FIGS. 8A and 8B, which will be discussed in further detail below.

The object is then displayed in block 124. In certain embodiments, the object is displayed on a computer monitor, a telephone display screen, a television screen or a personal digital assistant (PDA) display screen.

To obtain another object in the group of related objects, the front end sends a value to the backend in block 126. The value is correlated to the coordinate system assigned to the object, as will be discussed in further detail below. The backend receives the value in block 128, and determines the identity of the object requested in block 130. The process to determine the identity of the requested object varies depending on the embodiment. Various methods of determining the identity of the requested object will be detailed further below with regard to FIGS. 9A-9E.

Once the identity is determined, the requested object, e.g. 116B, is retrieved in block 132, and then sent to the front end in block 134. The front end receives the new object in block 136, and displays the new object in block 138. The process then repeats if another object in the group of related objects, e.g. 116C, is to be viewed.

Front End

FIG. 2 depicts a flow diagram of a front end in a system for navigating a group of related data in accordance with one embodiment of the invention. The embodiment of the front end in FIG. 2 varies in several ways from the front end embodiment shown in FIG. 1. For example, in FIG. 2, block 210 gets a visual object in a group of related visual objects. In one embodiment consistent with FIG. 2, block 210 may encompass both request block 110 and receive block 120 of FIG. 1. In another embodiment consistent with FIG. 2, block 210 may encompass receive block 120 of FIG. 1, but not request block 110.

For example, in one embodiment a request for the first object may come from a backend module, rather than from a front end module. Specifically, in one embodiment, a software program running in the background may automatically launch when a user powers on a computer. The program may request the first image without ever interacting with the user through a front end interface. In another embodiment, a backend server program may be preconfigured to push a first object in a group of related objects to a client when a specific event, unrelated to the front end, is triggered. This event may be, for example, a specific time or a completion of a computer process.

For example, when a database backup is complete, the backend may automatically generate a report. The pages of the report may be the group of related objects. The backend may be preconfigured to transmit the first page of the report upon completion of the backup. In such an embodiment, block 210 correlates to block 120 of FIG. 1, but not to block 110.

Additionally, in the embodiment of FIG. 2, object 216A is displayed in block 222 before a coordinate system is assigned in block 224. In the embodiment of FIG. 1, in contrast, object 116A is displayed in block 124 after a coordinate system is assigned in block 122.

In either case, whether the system assigns the coordinate system before or after the object is displayed, the coordinate system is generally not rendered on the display. Furthermore, in certain embodiments, the coordinate system may have its origin at the center of the rendered object, as seen in the block 224. In other embodiments, the coordinate system may have its origin at any point within the rendered object, such as the top left corner, the bottom left corner, the top right corner, or the bottom right corner.

To obtain another object in the group of related objects, the front end system determines a value in block 225. The value is correlated to the coordinate system assigned to the object in block 224. The method for determining the value and the relationship between the value and the coordinate system depends on the embodiment of the invention.

For example, in one embodiment consistent with FIG. 2, the objects are images related to each other through a pre-assigned viewing order. When a user is in the right half of the coordinate system, the front end indicates that triggering a user input device (e.g. a mouse) will request the next object in the series, as shown in block 225. When the user is in the left half of the coordinate system, the front end indicates that triggering the user input device will request the previous object in the series. When the user input device is triggered, the front end retrieves the location of the cursor in the coordinate system. Since the origin of the coordinate system is at the center of the rendered object 216A, a positive x-coordinate indicates that the cursor was in the right half of the rendered object when an input device was triggered, while a negative value x-coordinate indicates that the cursor was in the left half. Therefore, in the embodiment of FIG. 2, a positive x-coordinate indicates a desire for the next object in the viewing order, while a negative x-coordinate indicates a desire for the previous object.

In certain embodiments consistent with FIG. 2, the value sent from the front end to the backend in block 126, may be the x-coordinate itself, a number indicating whether the x-coordinate is positive or negative, or a text string e.g. "next" or "previous." In other embodiments, the value may be the y-coordinate, a combination of the x-coordinate and y-coordinate, a filename, a uniform resource locator (URL) string, or an index number, as will be discussed in further detail with regard to FIGS. 9A-9E.

After the value is determined and transmitted to the backend of the navigation system in block 126, the front end receives the requested object in block 136. The process then repeats, with the front end system displaying the new object in place of the previous object. In this case, object 216B will be displayed in place of object 216A.

Backend

Figure 3:
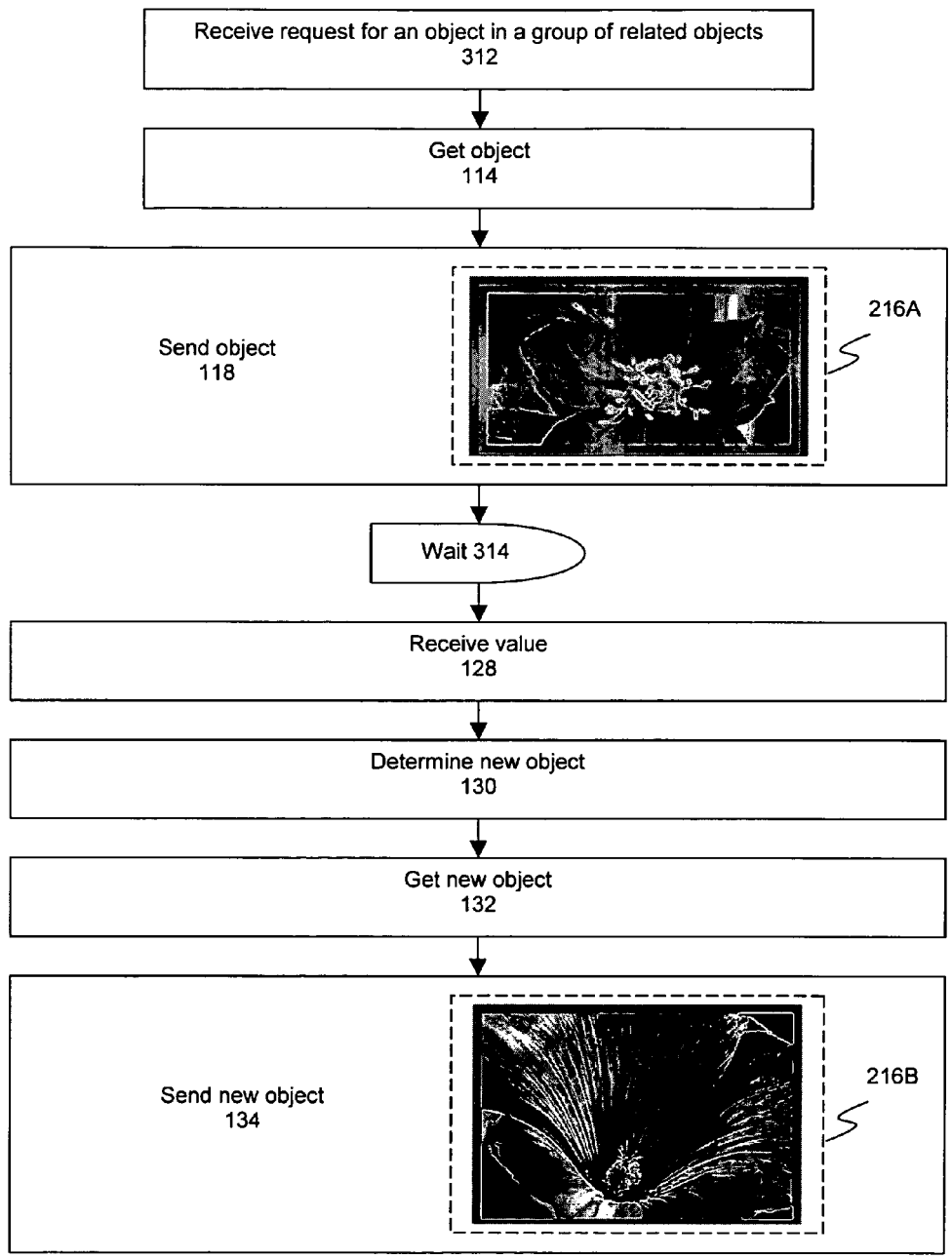
FIG. 3 depicts a flow diagram of a backend in a system for navigating a group of related data in accordance with one embodiment of the invention.

FIG. 3 depicts a flow diagram of a backend in a system for navigating a group of related data in accordance with one embodiment of the invention. The embodiment of FIG. 3 varies in several ways from the embodiment shown in FIG. 1. For example, in block 312, the backend receives a request for an object in a group of objects. The request may not come from the same front end which displays the object, as is indicated in the embodiment of FIG. 1. Rather, the request may come from a number of sources, including other backend components and/or front ends different from the front end which displays the object.

Once the backend receives the request, the backend gets the object, as shown in block 114. The object may be stored locally in the backend system, or remotely in another system. In one embodiment, the object is stored in the same machine as a machine receiving requests and transmitting objects. In another embodiment, the object is stored in a machine different from, but coupled to, a machine receiving requests and transmitting objects. In addition, the object may be stored, along with other objects in the group, in a data collection with other groups. For example, group 216 may be stored in the same data collection as a group 116.

In FIG. 3, after getting object 216A, the backend system sends the object in block 118. The backend system then waits in block 314 until it receives a value from the front end indicating a request for another object in the group of related objects, in block 128. The backend system determines from the value the identity of the new object, gets the new object, and transmits the new object. Specifically, in FIG. 3, the backend determines in block 130 that the requested object is object 216B from the value received in block 128. The backend gets the new object in block 132, and sends the object in block 134.

System Environments

As previously indicated, a navigation system in accordance with the present invention may exist in various environments. For example, in a network environment, a navigation system in accordance with one embodiment of the invention may have a front end that is a client and a backend that is a server. In a stand-alone environment, a navigation system in accordance with one embodiment of the invention may have a front end that includes software user interfaces (UIs), and a back-end that includes software threads, software processes and/or hardware which process user input.

Figure 4:
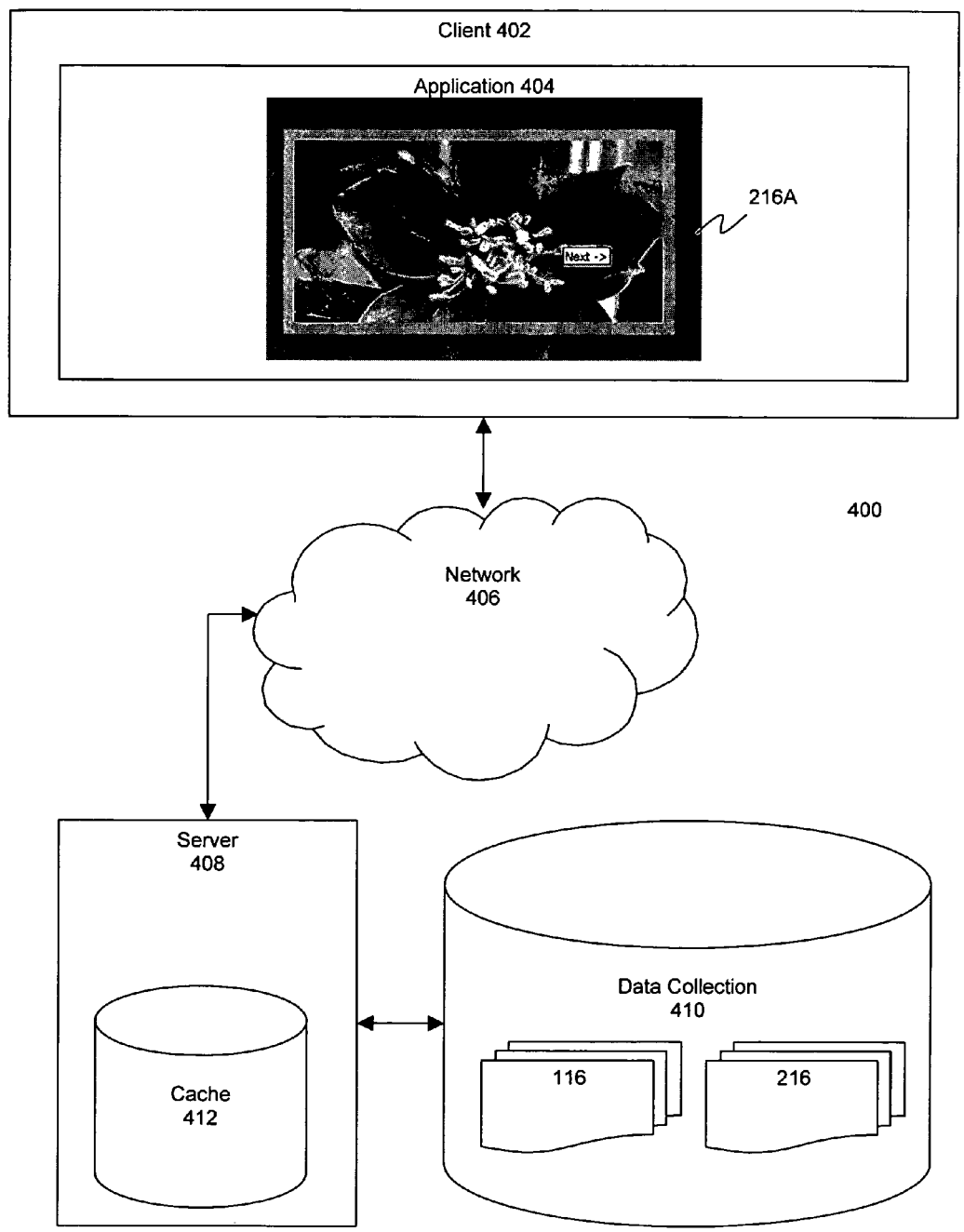
FIG. 4 depicts a flow diagram of a system in accordance with one embodiment of the invention.

FIG. 4 depicts a flow diagram of a system in accordance with one embodiment of the invention. In FIG. 4, a client 402 includes an application 404 which displays object 216A. In one embodiment, client 402 and application 404 together form front end 102 of FIG. 1. In one embodiment, client 402 is a personal computer. In other embodiments, client 402 may be another electronic device, e.g. a terminal, a telephone, a PDA or a television. Generally, client 402 is a component of system 400 capable of displaying object 216A.

Application 404 is capable of rendering object 216A visible to a user of client 402. Application 404 may be a software program, e.g. an executable or script. For example, in one embodiment, application 404 is a web browser. In other embodiments, application 404 may be a digital photo album program (e.g. Picasa™), an email client (either web-based and non-web based) or an image reader.

Object 216A is received by client 402 from network 406. Generally, network 406 provides a path for object 216A to travel between server 408 and client 402. Network 406 may be a wide area network (WAN), such as the Internet. In other embodiments, network 406 may also be a metropolitan area network (MAN), such as those used on college campuses, a local area network (LAN), such as those used within an office building or household, or a personal area network (PAN), such as those used between wireless computer peripherals.

Network 406 may use a number of communications protocols, including various combinations of protocols at different open systems interconnection (OSI) model levels. For example, network 406 may use integrated services digital network (ISDN), point-to-point protocol (PPP), X.25, internet protocol (IP), transmission control protocol (TCP), user datagram protocol (UDP), file transfer protocol (FTP), and hypertext transfer protocol (HTTP).

In addition, the signals transmitted through network 406 may travel through landlines, airwaves, or a combination thereof. In certain embodiments, network 406 may conform to wireless communications standards such as Bluetooth and the Institute of Electrical and Electronics Engineers (IEEE) 802 standards, e.g. IEEE std. 802.11g-2003, published Jun. 27, 2003.

In addition, network 406 may include devices such as satellites, gateways and routers. For example, network 406 may be a telecommunications network which includes devices to transmit and receive signals from a mobile telephone client through an access tower, to a satellite, down to a base station, through a land-base telephone line and to a computer. In such an embodiment, the mobile telephone client displays the objects stored in the computer.

As another example, network 406 may be a computing network which includes devices to transmit and receive signals from a console, through a wireless adapter, to a router, through a broadband modem, to an ISP network of computers, through the Internet backbone and back through another set of devices to a data storage device. In such an embodiment, the console displays the objects stored in the storage device.

In FIG. 4, server 408 provides access to objects stored in a cache 412 as well as data collection 410. In certain embodiments, server 408 is a web server, a file server or an image server. In one embodiment, server 408 is a software application which provides access to object 216A and the other objects in group 216. In another embodiment, server 408 is a physical machine on which such software runs.

In the embodiment of FIG. 4, cache 412 may store more frequently accessed objects within the group of related objects 216. This cache permits an object to be transmitted to client 402 with less delay since server 408 may retrieve an object stored within the cache rather than retrieving the object from data collection 410. In other embodiments, server 408 may not include a cache.

In embodiments without catch 412, or embodiments in which an object to be transmitted is not within cache 412, server 408 retrieves the object from data collection 410. In FIG. 4, data collection 410 is separate from server 408. For example, data collection 410 may be a database stored in a machine different from the machine in which the server resides. In another embodiment, data collection 410 may be part of server 408. For example, data collection 410 may be a database stored on the same machine as server 408. In other embodiments, instead of being a database, data collection 410 may be other types of data collections, such as a table within a database, an array, a table within a spreadsheet, a comma delineated list, a tab delineated list, or an extensible markup language (XML) file.

In certain embodiments, data collection 410 is stored on nonvolatile memory, such as a hard disk, CD, DVD, floppy disk, magnetic tape, flash disk, or ROM. In some embodiments, data collection 410 may be stored in volatile memory, such as dynamic random access memory (DRAM), synchronous DRAM (SDRAM), or content addressable memory (CAM).

Data collection 410 stores a group of related objects, such as group 216. In the embodiment of FIG. 4, data collection 410 also stores other groups of related objects, such as group 116.

As an example, in one embodiment consistent with FIG. 4, application 404 requests object 216A from server 408 through network 406. Server 408 examines cache 412 to determine if object 216A is available in the cache. If object 216A is not available, server 408 queries data collection 410. Server 408 retrieves object 216A and transmits it to client 402 through network 406. Client 402 receives object 216A and provides it to application 404. Application 404 renders object 216A, which, in this embodiment, is a digital photograph of a flower.

When a user rolls a cursor over the image, and therefore into a coordinate system assigned to object 216A, a visual cue indicates to the user a navigational direction. For example, FIG. 4 shows a visual cue overlaying rendered object 216A indicating to a user that triggering an input device while the cursor is at that location will send a request for the "next" object.

In one embodiment, when the user triggers the input device, the x-coordinate of the cursor is captured. A value correlated to the x-coordinate is transmitted to server 408 through network 406. For example, the x-coordinate may correlate to a URL string with an identification number of the "next" object. A different x-coordinate may correlate to a URL string with an identification number of the "previous" object.

Server 408 receives the value, determines the identity of the requested object and then, in one embodiment, examines cache 412 and then data collection 410 for the object. Once the requested object is retrieved, server 408 transmits the object to client 402, and the process may repeat itself as appropriate.

Figure 5:
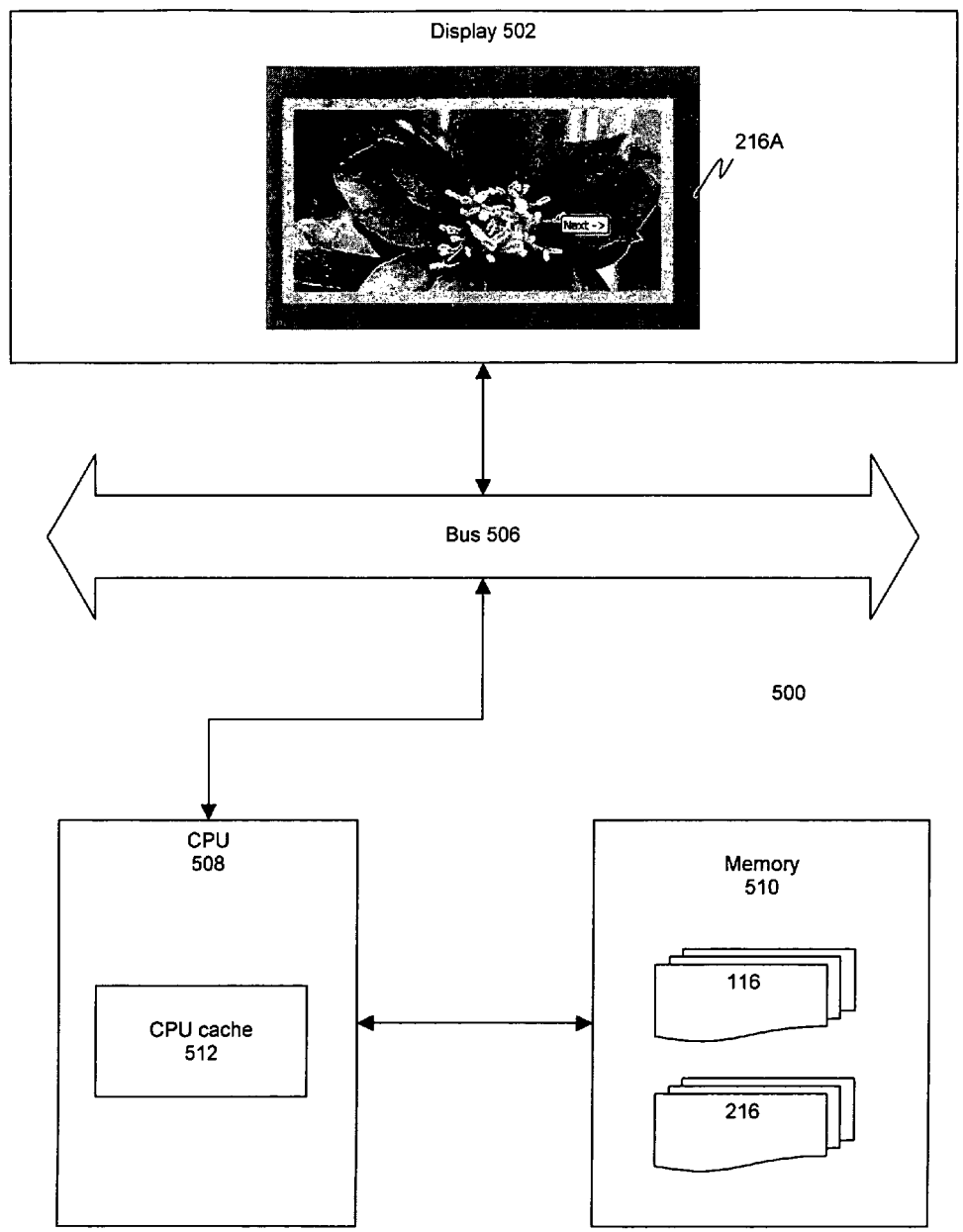
FIG. 5 depicts another flow diagram of a system in accordance with one embodiment of the invention.

FIG. 5 depicts another flow diagram of a system in accordance with one embodiment of the invention. In FIG. 5, display 502 renders visible object 216A. In certain embodiments, display 502 may be a cathode ray tube (CRT) monitor, a liquid crystal display (LCD) monitor, a plasma display or a projector display. In the embodiment of FIG. 5, display 502 receives a signal representing object 216A, transmitted across computer bus 506. Bus 506 carries electrical signals between components of system 500, such as signals from central processing unit (CPU) 508 to display 502. In certain embodiments, bus 506 is either a serial bus or a parallel bus. Bus 506 may be either an internal or external bus.

In the embodiment of FIG. 5, CPU 508 includes a CPU cache 512, which stores frequently requested objects. These objects or groups of objects, e.g. groups 116 and 216, may be also stored in memory 510. Memory 510 may be volatile memory, nonvolatile memory, or a combination thereof.

As an example, in one embodiment consistent with FIG. 5, processor 508 receives a request to transmit object 216A to display 502. Processor 508 examines cache 512 to determine if object 216A is available in the cache. If object 216A is not available, processor 508 examines memory 510. Processor 508 retrieves object 216A and transmits it to display 502 through bus 506. Display 502 receives the signal representing object 216A and renders it.

When a user rolls a cursor over the image, and therefore into a coordinate system assigned to object 216A, a visual cue indicates to the user a navigational direction. For example, in FIG. 5, the symbolic cue "Next→" is indicated. In one embodiment, when the user triggers the input device, both the x-coordinate and y-coordinate of the cursor is captured. A value correlated to the coordinates is transmitted to processor 508 through bus 506. For example, the coordinates may correlate to a filename. Different coordinates may correlate to a different filename.

Processor 508 receives the value, determines the identity of the requested object and then, in one embodiment, examines cache 512 and memory 510 for the object. Once the requested object is retrieved, processor 508 transmits the object to display 502, and the process may repeat itself as appropriate.

Examples

The following provides variations and examples of various aspects of the invention. It will be appreciated that the following variations and examples are not intended to be exhaustive or to limit the invention to the precise forms disclosed. These variations and examples are to provide further understanding of the present invention.

Visual Cues

Figure 6:
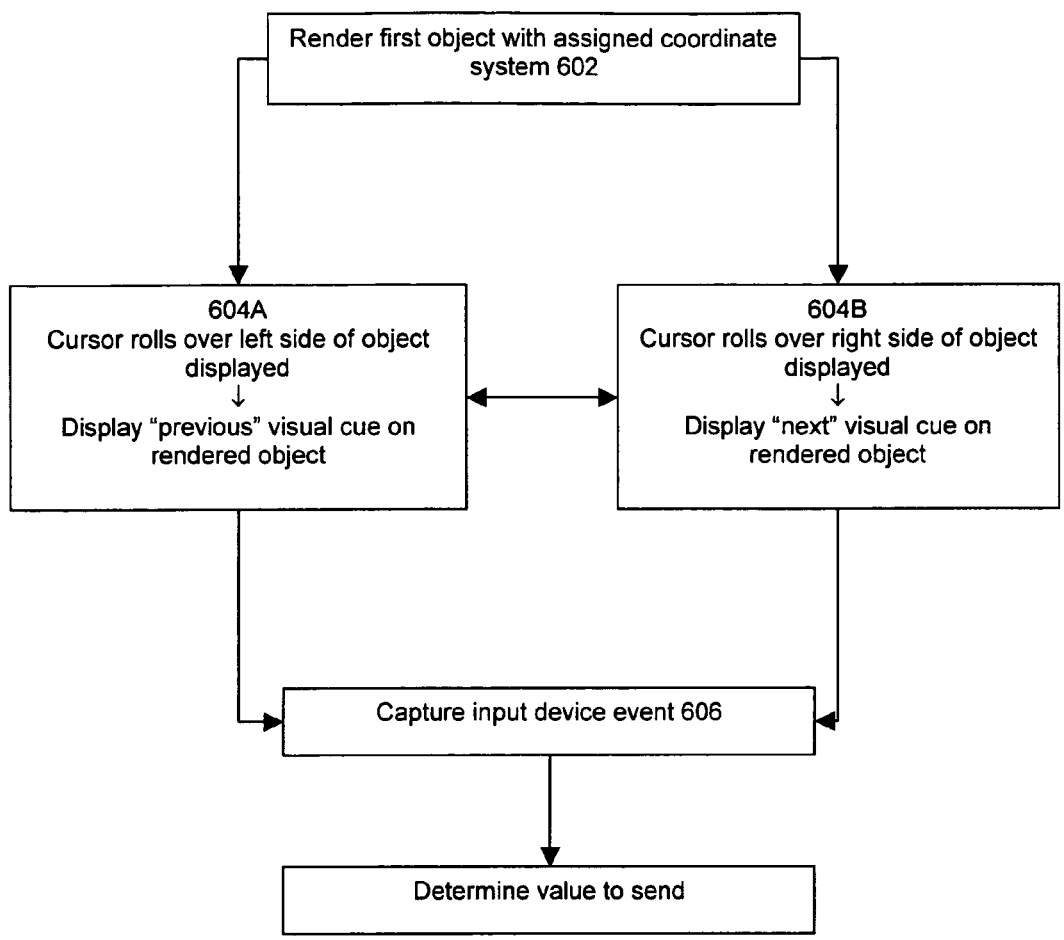
FIG. 6 depicts a block diagram of one part of a front end in a system for navigating a group of related data in accordance with one embodiment of the invention.

FIG. 6 depicts a block diagram of one part of a front end in a system for navigating a group of related data in accordance with one embodiment of the invention. In block 602, a first object, with an assigned coordinate system, is rendered. The coordinate system may be assigned before or after the object is rendered. When a cursor rolls over the rendered object, the front end provides a visual cue to the user, as indicated in blocks 604A and 604B.

Figure 7A:
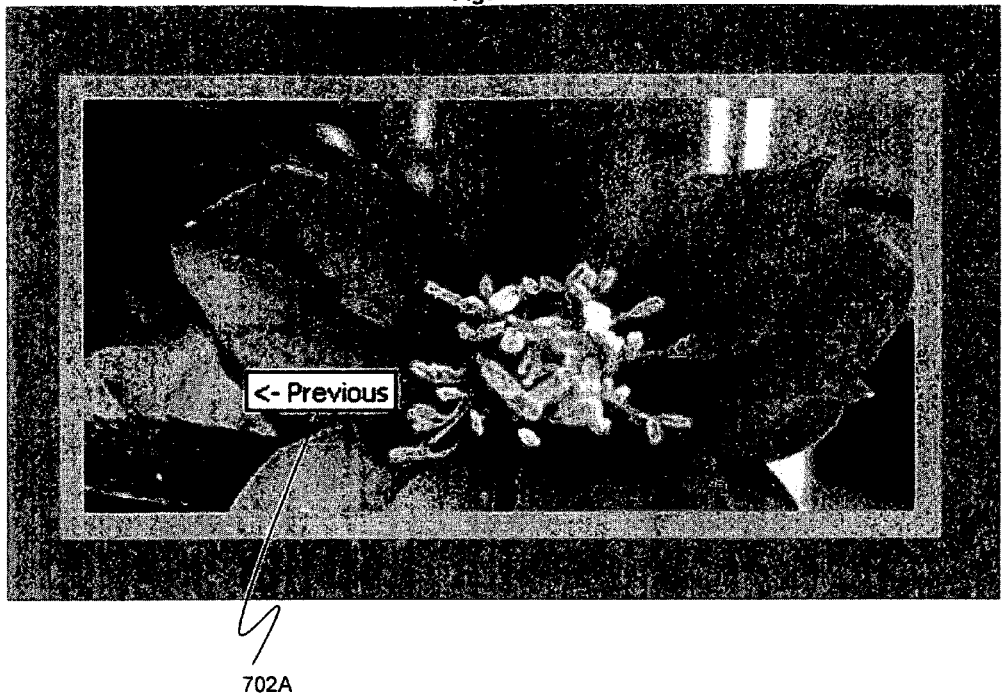
FIGS. 7A-7C depicts various visual cues in accordance with various embodiments of the invention.
Figure 7B:
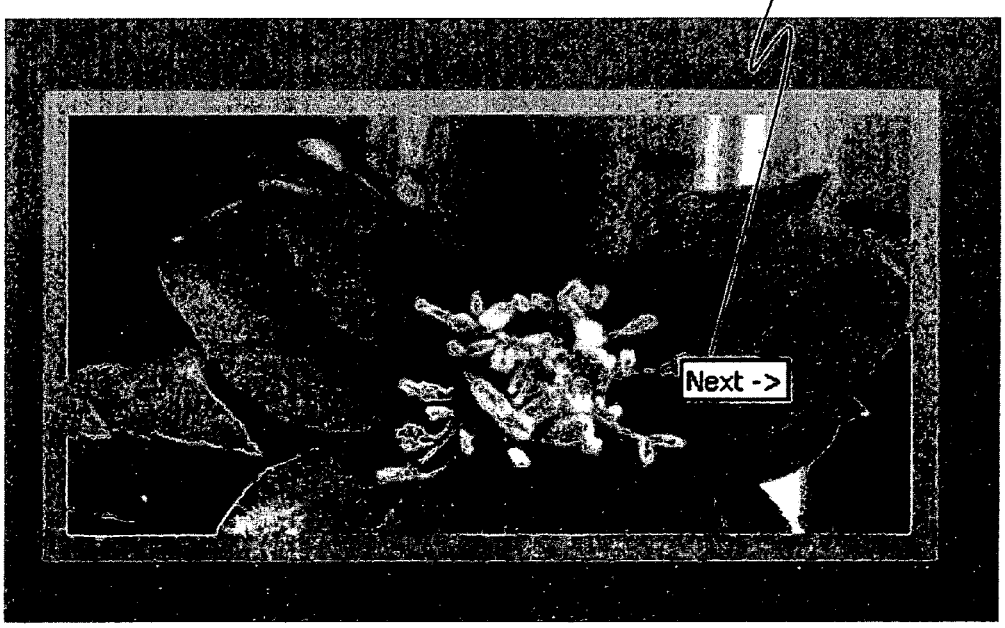
Figure 7C:
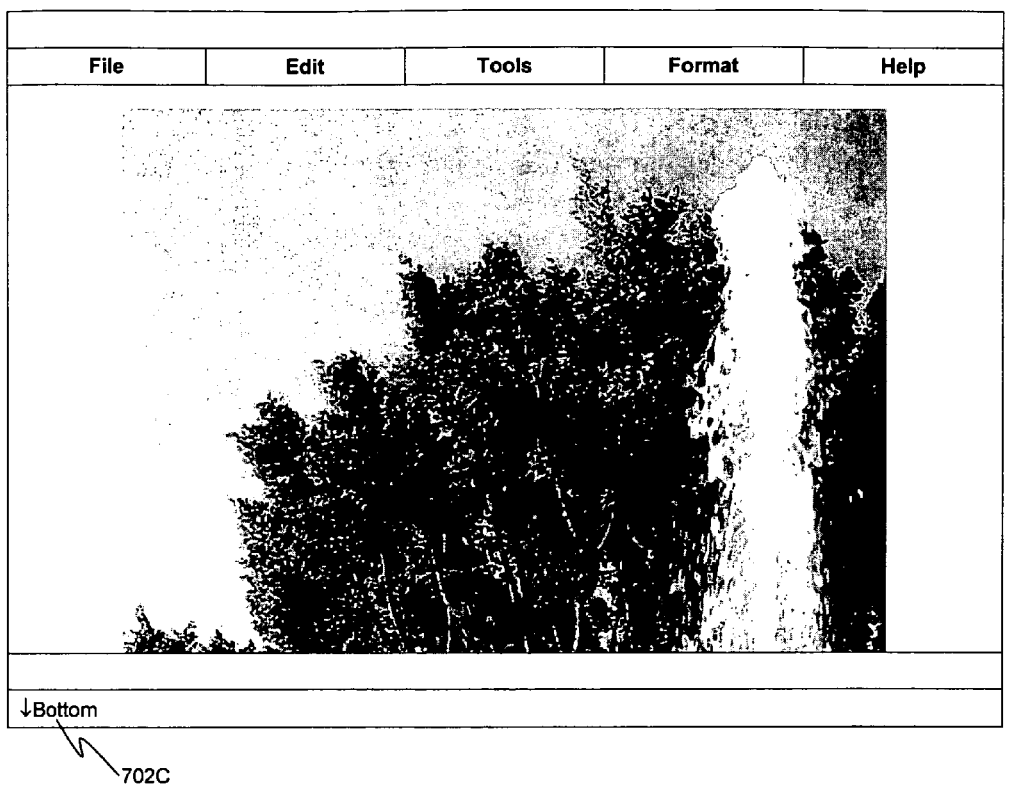

In block 602A, when a cursor rolls over the left half of the rendered object, a text and/or image overlay indicates that triggering an input device at that time will initiate a request for the previous object. A text and/or image overlay may appear near the cursor, overlapping the rendered object, as shown in FIG. 7A. In another embodiment, a visual cue may appear in a location which does not obscure the rendered object's visibility. For example, the visual cue may appear above the objects or in a window frame, as shown in FIG. 7C.

In block 602B, when the cursor rolls over the right half of the rendered object, a text and/or image overlay indicates that triggering an input device at that time will initiate a request for the next object. A text and/or image overlay may appear near the cursor, overlapping the rendered object, as shown in FIG. 7B. In another embodiment, the visual cue may appear in a location which does not obscure the rendered object's visibility.

In other embodiments, several visual cues may appear in various locations. For example, an image overlay may appear over the rendered object while, at the same time, a textual cue appears in a window frame.

In other embodiments, a visual cue indicating "previous" or "next" may not be appropriate and a different visual cue may be used. For example, in one embodiment, the rendered object is part of a larger single visual image. The visual cue may indicate which portion of the visual will be requested and rendered. For example, the visual cue may indicate that the bottom half of the larger single visual image will be requested, as shown in FIG. 7C.

In one embodiment, the visual cue is a thumbnail of the object to be requested. For example, in one embodiment, the visual cue is a thumbnail showing the bottom half of the larger single visual image. In another embodiment, the visual cue is a thumbnail showing the next or previous image in the series of images.

In one embodiment, the visual cue indicates whether triggering an input device will request a first image in a series or a last image in a series. In another embodiment, the visual cue indicates whether the "next" image will be actually the first image in the series, similar to a "repeat" button on a stereo.

In these systems, the visual cue alters its appearance when the cursor is relocated to a different region of the rendered object. The cues act as navigational sign posts, and may appear where appropriate and/or convenient. The cues appear when the cursor is located within a coordinate system assigned to the rendered object. The cursor will be associated with a coordinate in the coordinate system when the input device is triggered. In FIG. 6, when the input device is triggered, the front end system captures the event in block 606 and then proceeds to determine the value to send to the back-end system.

Providing a navigation method in which the navigation correlates with a coordinate system assigned specifically to a rendered object improves navigation time. For example, in one embodiment, after viewing an image, rather than scrolling to another location on the page to navigate to the next image, a user may click on a visible region of the image. This reduces the amount of time to navigate the group of images. In embodiments in which a visual cue overlays the rendered object, navigation time is further reduced. The overlay indicates to a user the consequences of clicking a mouse, for example, while not requiring that the user's eye to wander to another location on the display. Additionally, in embodiments where the overlay is a thumbnail, the user may be aware of the content of the next object before requesting that object. The user may decide not to navigate down that particular path.

Assigning Coordinate Systems

Figure 8C:
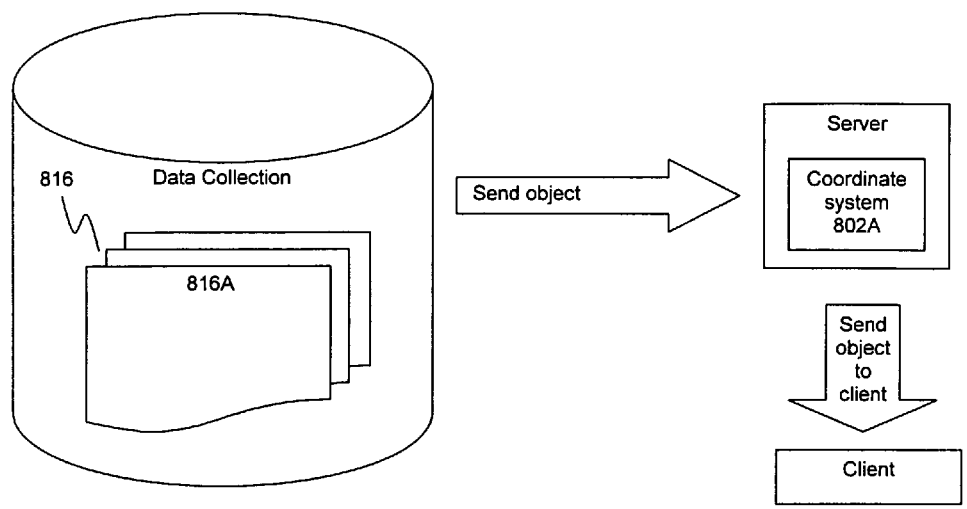

The coordinate system may be assigned to an object at various points in the process and still be within the scope of this invention. FIGS. 8A-8C illustrates several points in which a coordinate system may be assigned to an object in accordance with various embodiments of the invention.

As previously mentioned, a coordinate system may be assigned before or after an object is rendered. FIG. 8A depicts one system in which coordinate systems are assigned after transmission to a front end in accordance with one embodiment of this invention. In FIG. 8A, the client system assigns the coordinate system to the object. In one embodiment, the coordinate system is assigned in the front end before the object in rendered. In another embodiment, the coordinate system is assigned in the front end after the object in rendered.

In other embodiments, a coordinate system may be assigned in the backend, before the object is transmitted, as shown in FIGS. 8B-8C. FIG. 8B depicts one system in which coordinate systems are assigned before transmission to a front end in accordance with one embodiment of this invention. In FIG. 8B, objects 816 are stored with pre-assigned coordinate systems. For example, object 816A may be stored with pre-assigned coordinate system 802A. In one embodiment, a coordinate system is a property of each object, assigned when an object is added to the data collection. When the object is transmitted, the coordinate system is also transmitted.

FIG. 8C depicts another system in which coordinate systems are assigned before transmission to a front end in accordance with one embodiment of this invention. In FIG. 8C, object 816A is stored in the data collection without a pre-assigned coordinate system. Rather, a coordinate system is assigned to object 816A after the object is retrieved from the data collection, but before the object is transmitted to the client. In the embodiment of FIG. 8C, the server system assigns the coordinate system. In another embodiment, the object may be assigned a coordinate system before transmittal to the front end by a different system, e.g. a separate software application or a separate computing machine.

In the embodiments of FIG. 8A-8C, the object is transmitted from a data collection to a server. The server then transmits the object to a client. In other words, the navigation systems of FIGS. 8A-8C are client-server systems. It will be appreciated that other systems previously discussed, such as stand-alone systems, are equally applicable.

Values Transmitted to Retrieve Object

FIGS. 9A-9F depicts various systems transmitting values to request a second related object in accordance with various embodiments of the invention. In the embodiments shown in FIGS. 9A-9F, the values are transmitted from a front end to a backend of a navigation system. The type of value transmitted affects the method the backend will use to determine the new object to be sent to the front end.

Figure 9A:
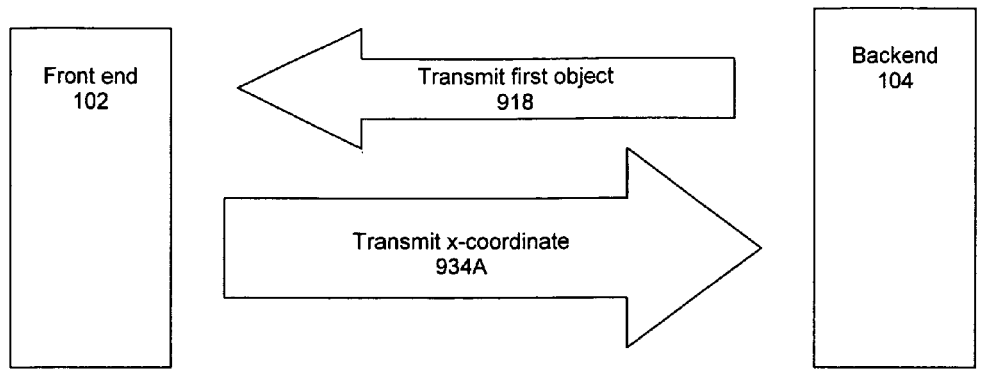
FIGS. 9A-9F depicts various systems transmitting values to request a second related object in accordance with various embodiments of the invention.

For example, in FIG. 9A, the front end transmits the x-coordinate of a cursor captured when a trigger event occurred (e.g. a mouse button click). A backend system receiving the coordinate determines the identity of the requested object from the coordinate. For example, in one embodiment, the origin of the coordinate system is at the center of the rendered object. The backend system is aware of the location of this origin, and therefore is aware that a positive x-coordinate indicates a request for a subsequent object in the series of objects. The backend system also determines that a negative x-coordinate indicates a request for a prior object in the series.

In another embodiment, the origin may be at the top left corner of the image. In such an embodiment, if the x-coordinate is greater half the image width (i.e. x-coordinate>image width/2), then a subsequent object in the series of objects is requested. If the x-coordinate is less than half the image width (i.e. x-coordinate<image width/2), then a prior object is requested.

In another embodiment, the y-coordinate may be transmitted. In such an embodiment, a positive y-coordinate may indicate that a prior image is requested, and a negative y-coordinate may indicate that a subsequent image is requested. In another embodiment, a positive y-coordinate may indicate that the top half of an image is requested, and a negative y-coordinate may indicate that a bottom half of an image is requested. In another embodiment, both an x-coordinate and a y-coordinate may be transmitted.

In the embodiment of FIG. 9A, and the variations described above, significant processing is performed in the backend system to determine the identity of the requested object. Such a configuration may be desirable in computing and/or telecommunication systems in which the front end systems have limited computing resources, e.g. in systems with thin clients. In other embodiments, more processing may be performed on the client side than in the embodiment of FIG. 9A.

Figure 9B:
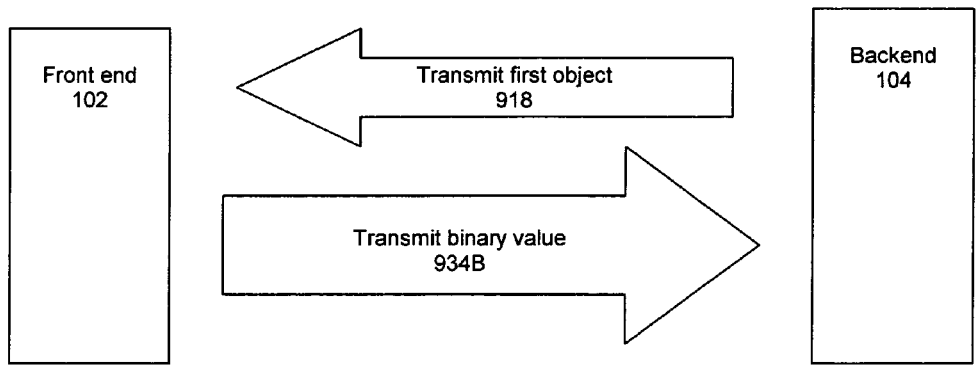

For example, in the embodiment shown in FIG. 9B, rather than transmitting one or more coordinates, a front end transmits a binary value. For example, the front end may transmit 0 to indicate that a prior image is requested and 1 to indicate that a subsequent image is requested. In another embodiment, the binary values may be a positive and negative number, e.g. −1 and +1. A negative number may indicate that a prior image is requested and a positive number may indicate that a subsequent image is requested.

Figure 9C:
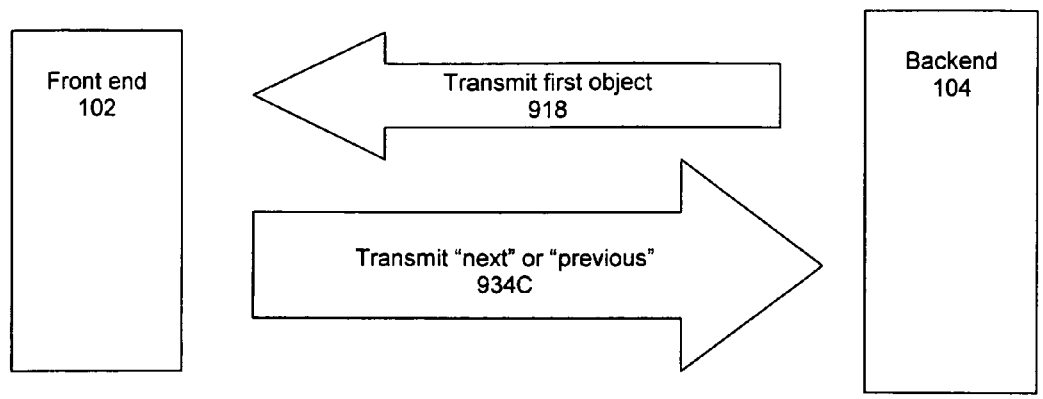

In other embodiments, a text string may be transmitted. In the embodiment of FIG. 9C, the string "next" or "previous", or variations thereof, is transmitted. In other embodiments, other text strings may be used, e.g. "first," "last," "top," "bottom," or the like. In such embodiments, the front end determines a specific relationship (e.g. a navigational direction or a geometric relationship) between the cursor coordinates and the new object being requested. The front end (e.g. a client) performs significant processing to determine the relationship, and transmits this relationship to the backend (e.g. a server). This configuration reduces the amount of backend processing executed to determine the identity of the requested object.

In another embodiment, rather than transmitting a text string to indicate the relationship between the current object and requested object, an index value may be transmitted. For example, in one embodiment, an index increment number is transmitted, e.g. 2. This increment number may indicate to the backend system the number of rows to increment in a database table to find the filename for the requested object, for example. Thus, if the index increment number is 2, then the front end is indicating to the backend that information about the requested object is two rows down from the current row, which contains information about the currently displayed object. These embodiments are particularly useful in systems which store the objects in, for example, indexed database tables.

Figure 9D:
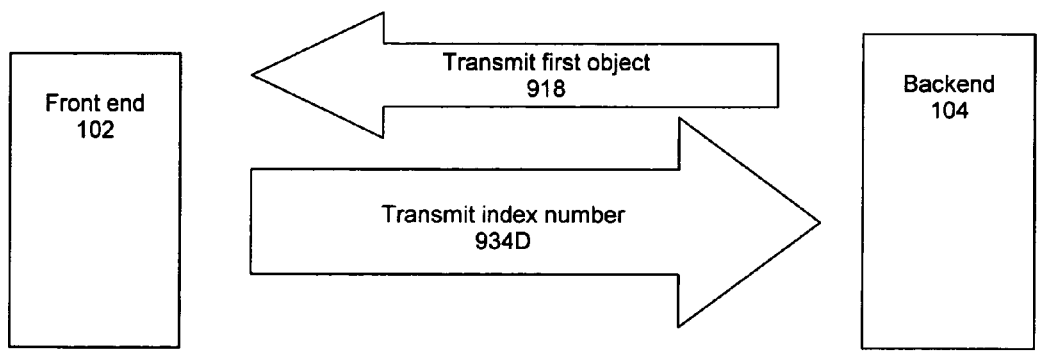
Figure 9E:
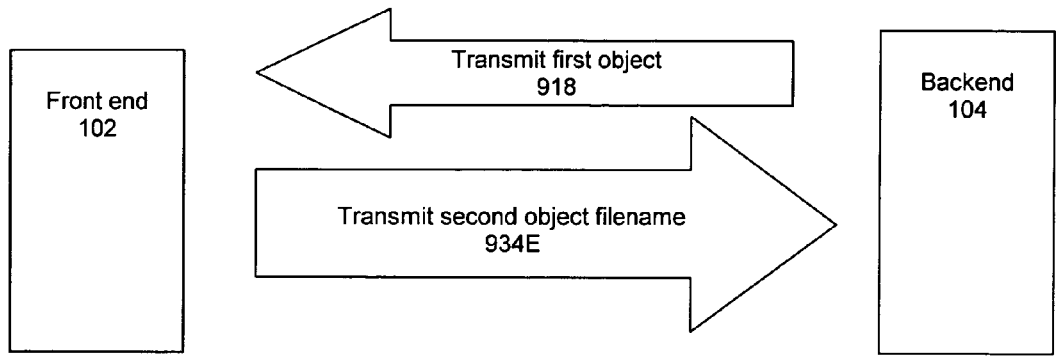
Figure 9F:
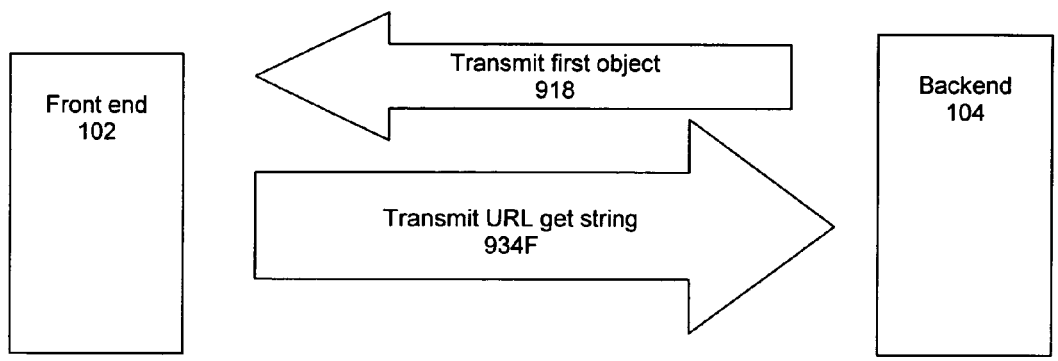

In another embodiment, rather than representing an increment, the index number may directly represent the position of a requested object in a database, as shown in FIG. 9D. For example, in one embodiment, the index number may 200, indicating to the backend that the filename of the requested object may be found in row 200 of a certain database table.

In yet another embodiment, the front end may transmit a text string directly identifying the new object. For example, in the embodiment of FIG. 9E, the value is a requested object's filename, e.g. "vacation2.jpg." In such an embodiment, the backend having received the identity of the requested object, still determines the location of the object in the backend.

In still another embodiment, the transmitted value indicates not only the requested object's identity (e.g. filename), but also its location. For example, in the embodiment of FIG. 9F, the value is a uniform resource locator (URL), e.g. http://www.helloworld.com/family/dad2.jpg. In another embodiment, the URL may be an HTML GET string, e.g. http:// www.helloword.com/view.php?album=family&pid=dad2. As indicated, the GET string may include more than one variable (e.g. album and file).

FIG. 10 depicts consecutive screen shots in accordance with one embodiment of the invention. Specifically, FIG. 10 illustrates screen shots of a front end in a navigation system in which a URL GET string is transmitted to the backend system to retrieve the new object.

Generally, the type of value transmitted from the front end system to the backend system determines the allocation and degree of processing between the front end and backend. Certain types of values take less processing by the front end system (e.g. x-coordinate) than other types of values (e.g. filename). Additionally, certain types of values may benefit from querying a data collection (e.g. filename) while other types may not.

Conclusion

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings or may be acquired from practice of the invention. For example, while a series of acts has been described with regard to FIG. 1, the order of the acts may differ in other implementations consistent with the present invention. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated. Furthermore, the use of the phrase "one embodiment" throughout does not necessarily mean the same embodiment. Although these particular embodiments of the invention have been described, the invention should not be limited to these particular embodiments.

What is claimed is:

1. A method, comprising:
   transmitting a first object in a group of related objects, the first object being a first digital photograph in a digital photo album, the digital photo album being the group of related objects associated with a sequential order of digital photographs in the digital photo album;
   receiving a value that corresponds to a first coordinate of a coordinate system, the coordinate system assigned to the rendered first object after the first object has been transmitted and rendered, wherein the value indicates a user selection of the rendered first object at a distance along a first axis of the coordinate system to initiate a retrieval of a second object in the group of related objects;
   in response to receipt of the value, determining from the value and the coordinate system, the second object in the group of related objects based on the value relative to the first axis of the coordinate system and the sequential order of digital photographs in the digital photo album; and
   transmitting the second object being a second digital photograph in the digital photo album to replace the first object.

2. The method of claim 1, wherein the first and second objects are visual objects.

3. The method of claim 1, wherein the first and second objects are electronic files.

4. The method of claim 1, wherein the transmitting is over a computer bus.

5. The method of claim 1, wherein the transmitting is over a network.

6. The method of claim 5, wherein the network is a personal area network (PAN), local area network (LAN) or wide area network (WAN).

7. The method of claim 5, wherein the network is a wireless network.

8. The method of claim 7, wherein the wireless network is a mobile telephone network.

9. The method of claim 1, further including a client assigning the coordinate system.

10. The method of claim 1, further including a server assigning the coordinate system.

11. The method of claim 1, further comprising:
   wherein the rendered first objet is a first portion of a visual image and the retrieved second object is a second portion of the visual image that is adjacent to the first portion.

12. The method of claim 11, further comprising: wherein the visual image is a digital photograph with a resolution greater than a display that displays the first object and the second object.

13. The method of claim 1, wherein an origin of the coordinate system is assigned to the center of the first digital photograph, and wherein the second object in the group of related objects is determined to be a digital photograph that is after the first digital photograph in the digital photo album when the value is positive, and the second object in the group of related objects is determined to be a digital photograph that is before the first digital photograph in the digital photo album when the value is negative.

14. The method of claim 1, wherein an origin of the coordinate system is assigned to a top left corner of the first digital photograph, and wherein the second object in the group of related objects is determined to be a digital photograph that is after the first digital photograph in the digital photo album when the value is greater than half the width of the first digital photograph, and the second object in the group of related objects is determined to be a digital photograph that is before the first digital photograph in the digital photo album when the value is less than half the width of the first digital photograph.

15. A method, comprising:
   transmitting to a client a first image in a group of related images, the first image a digital photograph in a digital photo album, and the group of related images associated with a sequential ordering of a group of digital photographs in the digital photo album;
   receiving from the client a value that corresponds to a first coordinate of a coordinate system, the coordinate system assigned to the rendered first image after the first image has been transmitted and rendered, wherein the value indicates a client selection of the rendered first image at a distance along a first axis of the coordinate system to initiate a retrieval of a second image in the group of related images;
   in response to receipt of the value, querying a data collection to determine the second image in the group of related images value relative to the first axis of the coordinate system and the sequential ordering of the group of digital photographs in the digital photo album, the querying to include a parameter to be associated with the value and the coordinate system; and
   transmitting to the client the second image to replace the first image for display of a second digital photograph from the digital photo album.

16. The method of claim 15, wherein the first image and second image correspond to different image files.

17. The method of claim 15, wherein the value is to identify a coordinate of a cursor in the coordinate system.

18. The method of claim 15, wherein the value is to identify a relationship to the first object, the relationship to be derived from a coordinate of a cursor in the coordinate system.

19. The method of claim 15, wherein the value is to identify the second object, the value to be derived from a relationship to the first object, the relationship to be derived from a coordinate of a cursor in the coordinate system.

20. The method of claim 15, wherein the data collection is to be located remotely.

21. The method of claim 15, wherein the data collection is selected from a group consisting of a table, an array, a tab delineated list, a comma delineated list, an XML file, and a database.

22. A method, comprising:
displaying a first object in a group of related objects, the first object assigned a coordinate system only after being displayed, wherein first object is a first digital photograph in a digital photo album, and the group of related objects is associated with a sequential order of digital photographs in the digital photo album;
transmitting a value that corresponds to a first coordinate of the coordinate system assigned to the displayed first object, wherein the value indicates a user selection of the displayed first object at a distance along a first axis of the coordinate system to initiate a retrieval of a second object in the group of related objects based on the sequential order of digital photographs in the digital photo album indicated by the value;
receiving the second object, based on the value relative to the first axis of the coordinate system, in the group of related objects in response to the transmitting, the second object a second digital photograph in the digital photo album; and
displaying the second object in place of the first object.

23. The method of claim 22, wherein the transmitting is to a central processing unit.

24. The method of claim 22, wherein the transmitting is to a router or a server.

25. The method of claim 22, further comprising:
displaying a visual cue when a location of the cursor relative to the first axis is greater than a first value on the first axis of the coordinate system; and
varying the visual cue when the location of the cursor relative to the first axis is less than the first value on the first axis of the coordinate system.

26. The method of claim 25, wherein the visual cue is to overlap the object.

27. The method of claim 22, further comprising:
displaying a visual cue when a location of the cursor relative to the first axis is greater than a first value on the first axis of the coordinate system; and
varying the visual cue when the location of the cursor relative to the first axis is less than a first value on the first axis of the coordinate system, wherein the visual cue includes a thumbnail image that provides a preview of a digital photograph in the digital photo album that will be displayed in place of the first object in response to user selection at the first or second coordinate.

28. A method, comprising:
displaying a first image in a group of related images, the first image a digital photograph in a digital photo album, and the group of related images associated with a sequential ordering of digital photographs in the digital photo album;
assigning a coordinate system to the first image only after being displayed;
displaying a visual cue when a cursor is in a region of the first image;
recording, in response to an event, a first coordinate to indicate a location of the cursor along a first axis of the coordinate system assigned to the displayed first image at the time of the event;
determining a value from the first coordinate to initiate a retrieval of a second image in the group of related images, the second image a second digital photograph in the digital photo album;
transmitting the value;
receiving the second image in response to the transmitting based on the value relative to the first axis of the coordinate system and the sequential ordering of digital photographs in the digital photo album; and
displaying the second image in place of the first image.

29. The method of claim 28, wherein the event is an activation of an input device.

30. The method of claim 28, wherein the displaying is in a software application selected from a group consisting of a web browser, a digital photo album client, an email client and an image reader.

31. The method of claim 28, wherein the displaying is on a screen selected from a group consisting of a personal computer screen, a personal digital assistant (PDA) screen, a cellular telephone screen and a television screen.

32. The method of claim 28, wherein the first and second objects are in a format selected from the group consisting of joint photographies experts group (JPEG), graphics interchange format (GIP), tagged image file format (TIFF), portable network graphics (PNG), encapsulated postscript (EPS) and portable document format (PDF).

33. The method of claim 28, further comprising varying the visual cue when the cursor is in another region of the first image.

34. An apparatus, comprising:
a means for transmitting over a network a first object in a group of related objects, the first object a digital photograph in a digital photo album, and the group of related objects is associated with a sequential order of digital photographs in the digital photo album;
a means for receiving a value that corresponds to a first coordinate of a coordinate system, the coordinate system assigned to the rendered first object after the first object has been transmitted over the network and rendered for a user, wherein the value indicates a user selection of the rendered first object at a distance along a first axis of the coordinate system to initiate a retrieval of a second object in the group of related objects;
a means for searching, in response to the receiving, a data collection to determine the second object based on the value relative to the first axis of the coordinate system in the group of related objects and the sequential order of digital photographs in the digital photo album, the searching to include a parameter to be associated with the value; and
a means for transmitting over the network the second object being a second digital photograph in the digital photo album to replace the first object.

35. The apparatus of claim 34, wherein the means for searching include means for querying a local data collection and a remote server.

36. A non-transitory machine readable storage medium having instructions stored thereon, which when executed on a processing system, cause said processing system to perform a method comprising:
   transmitting a first object in a group of related objects, the first object being a first digital photograph in a digital photo album, and the digital photo album being the group of related objects is associated with a sequential order of digital photographs;
   receiving a value that corresponds to a first coordinate of a coordinate system, the coordinate system assigned to the rendered first object after the first object has been transmitted and rendered, wherein the value indicates a user selection of the rendered first object at a distance along a first axis of the coordinate system to initiate a retrieval of a second object in the group of related objects;
   in response to receipt of the value, determining from the value and the coordinate system, the second object in the group of related objects based on the value relative to the first axis of the coordinate system and the sequential order of digital photographs in the digital photo album; and
   transmitting the second object being a second digital photograph in the digital photo album to replace the first object.

37. The machine readable medium of claim 36, wherein the first object include a Uniform Resource Locator (URL).

38. The machine readable medium of claim 36, wherein the first object include a computer process identifier.

39. The machine readable medium of claim 36, wherein is to be stored in a local memory and the group of related objects is to be stored in a remote memory.

40. The machine readable medium of claim 36, wherein the second object comprises instructions to query a data collection with a parameter to be associated with the value.

41. A non-transitory machine readable storage medium having instructions stored thereon, which when executed on a processing system, cause said processing system to perform a method comprising:
   displaying a first object in a group of related objects, the first object being a first digital photograph in a digital photo album, the digital photo album being the group of related objects that is associated with a sequential order of digital photographs in the digital photo album;
   assigning a coordinate system to the first object only after being displayed;
   transmitting a value that corresponds to a first coordinate of the coordinate system assigned to the displayed first object, wherein the value indicates a user selection of the displayed first object at a distance along a first axis of the coordinate system to initiate a retrieval of a second object in the group of related objects;
   receiving the second object, based on the value relative to the first axis of the coordinate system and the sequential order of digital photographs in the digital photo album, in the group of related objects in response to the transmitting; and
   displaying the second object being a second digital photograph in the digital photo album in place of the first object.

42. The machine readable medium of claim 41, wherein the transmitting include transmitting over a network.

43. The machine readable medium of claim 41, further comprising:
   displaying a visual cue when a location of the cursor relative to the first axis is greater than a first value on the first axis of the coordinate system; and
   varying the visual cue when the location of the cursor relative to the first axis is less than the first value on the first axis of in the coordinate system.

44. The machine readable medium of claim 43, wherein the visual cue is to overlap the object.

45. The machine readable medium of claim 41, further comprising:
   displaying a visual cue when a location of the cursor relative to the first axis is greater than a first value on the first axis of the coordinate system; and
   varying the visual cue when the location of the cursor relative to the first axis is greater than a first value on the first axis of the coordinate system, indicates a relationship between the first object and an object that will be displayed in place of the first object in response to user selection at the first or second coordinate.

46. A system, comprising:
   a client system;
   a database to store a set of related visual objects, the set to include a first visual object and a second visual object corresponding to a first digital photograph and a second digital photograph in a digital photo album, wherein digital photo album being the group of related visual objects that is associated with a sequential order of digital photographs in the digital photo album; and
   a server coupled with the client and database to receive a value that corresponds to a position in a coordinate system assigned to the first visual object, the coordinate system assigned to the first visual object only after being transmitted by the server to the client system and after displayed on the client system, and the value indicates a client selection of the displayed first visual object at a distance along a first axis of the coordinate system to initiate a retrieval of the second visual object,
   to determine the second visual object from the value based on the value relative to the first axis of the coordinate system and the sequential order of digital photographs in the digital photo album, and
   to transmit the second visual object being the second digital photograph in the digital photo album to replace the first visual object.

47. The system of claim 46, wherein the system further comprises:
   a first server to receive the value and transmit the second visual object; and
   a second server, coupled with the first server, to store the set of related visual objects in the database.

48. The system of claim 46, wherein the value is a coordinate in the coordinate system and the determination includes translation of the coordinate to a relationship with the first visual object and identification of the second visual object from the relationship.

* * * * *